(12) United States Patent
Kitazawa

(10) Patent No.: US 11,695,437 B2
(45) Date of Patent: Jul. 4, 2023

(54) CONNECTING MEMBER AND RADIO CONTROL TRANSMITTER

(71) Applicant: FUTABA CORPORATION, Mobara (JP)

(72) Inventor: Hideo Kitazawa, Mobara (JP)

(73) Assignee: FUTABA CORPORATION, Mobara (JP)

( * ) Notice: Subject to any disclaimer, the term of this patent is extended or adjusted under 35 U.S.C. 154(b) by 0 days.

(21) Appl. No.: 17/730,682

(22) Filed: Apr. 27, 2022

(65) Prior Publication Data
US 2022/0352911 A1  Nov. 3, 2022

(30) Foreign Application Priority Data

Apr. 28, 2021  (JP) .............................. JP2021-075975

(51) Int. Cl.
*H04B 1/03* (2006.01)
*H04M 1/03* (2006.01)
*H04B 1/034* (2006.01)

(52) U.S. Cl.
CPC .................................. *H04B 1/0346* (2013.01)

(58) Field of Classification Search
CPC ........ H04B 1/0346; H04B 1/202; H04B 1/03; H04B 1/04; H04B 7/06; H04M 1/02; H04M 1/03
See application file for complete search history.

(56) References Cited

U.S. PATENT DOCUMENTS

| 11,425,472 B2* | 8/2022 | Komada ................... H04Q 9/00 |
| 2008/0237425 A1* | 10/2008 | Del Frari ............... F16M 13/00 248/309.1 |
| 2015/0253802 A1* | 9/2015 | Ozaki ....................... G05G 1/06 74/523 |
| 2018/0174749 A1* | 6/2018 | Santos .................. H01F 27/325 |

FOREIGN PATENT DOCUMENTS

JP          2003-325994       * 11/2003   ............. A63H 30/02

* cited by examiner

*Primary Examiner* — Andrew Wendell
(74) *Attorney, Agent, or Firm* — Bacon & Thomas, PLLC

(57) ABSTRACT

A connecting member in a radio control transmitter for transmitting a control signal to a control target by controlling an operating portion detachably attached to a main body is provided. The connecting member is disposed between the main body and the operating portion to randomly set a position of the operating portion with respect to the main body, wherein the connecting member has outer fitting holes arranged along a circumference of a large diameter and inner fitting holes arranged along a circumference of a small diameter to be concentric with arrangement of the outer fitting holes.

3 Claims, 9 Drawing Sheets

CONNECTING MEMBER AND RADIO CONTROL TRANSMITTER

TECHNICAL FIELD

The present disclosure relates to a connecting member (adapter) disposed between a main body and an operating portion for controlling a control target and detachably attached to the main body to randomly adjust and set a position of the operating portion with respect to the main body, and a radio control transmitter using the same; and, more particularly, to a connecting member that allows connection between an operating portion and the connecting member and connection between the connecting member and another connecting member at any angle in a positional relationship in a rotation direction, and a radio control transmitter using the same.

BACKGROUND

Japanese Patent Application Publication No. 2010-88536 discloses an invention related to a slope adapter for fitting an operating unit to a main body of a radio control transmitter. A slope adapter 20 has a first fitting surface 21 fitted to a main body side fitting portion 8 of a main body 1, and a circular second fitting surface 22 tilted with respect to the first fitting surface 21. In order to fit the operating unit to the main body of the radio control transmitter via the slope adapter, first, the first fitting surface 21 is fitted to the main body side fitting portion 8 such that the slope adapter 20 is located at an arbitrary position in a rotation direction, and then fixed thereto by screws inserted into fitting holes 21b. Next, an operating unit 6 is fitted to the second fitting surface 22 of the slope adapter 20 to be located at an arbitrary position in the rotation direction, and then fixed thereto by screws inserted into fitting holes 22b from four holes formed in the operating unit 6. In this invention, the operating unit 6 can be fitted to the main body 1 in an arbitrary tilted state, so that a load on a wrist of an operator of the radio control transmitter can be reduced.

Japanese Patent Application Publication No. 2003-325994 discloses an invention related to an adapter for attaching an operating unit to a main body of a radio control transmitter. As shown in FIG. 5 of Japanese Patent Application Publication No. 2003-325994, in a wheel 4 and an operating unit 10, an adaptor 11 is disposed between a main body 2 and the operating unit 10, so that the wheel 4 can be fitted to a position different from a main body side central portion 2a to which the wheel 4 is conventionally fitted. As shown in FIG. 7 of Japanese Patent Application Publication No. 2003-325994, the adapter 11 has a shape in which an operating unit fitting portion 11a to which the operating unit 10 is fitted and an adapter fixing portion 11b for fixing the adapter 11 to the main body side fitting portion 2a partially overlap. A plurality of adapter side fitting holes 11d for fixing the operating unit 10 are formed in the operating unit fitting portion 11a at regular intervals along a circumference. In this invention, the smooth operation of the radio control transmitter can be executed without causing hindrance to an operation of an operator.

SUMMARY

It is assumed that the operating unit is attached to the main body of the transmitter using the adapters disclosed in Japanese Patent Application Publication No. 2010-88536 and No. 2003-325994. According to the contents of Japanese Patent Application Publication No. 2010-88536 and No. 2003-325994, the fitting holes formed on the main body side of the transmitter are arranged in one row along the circumference, and the fitting holes formed on the adapter side to fit the operating unit are also arranged in one row along the circumference with the same radius as that in the main body side. Therefore, when an adapter having the fitting holes arranged in one row along the circumference to fit the operating unit is disposed between the main body having the fitting holes arranged in one line along the circumference and the operating unit, "conflict" of the fitting holes, which will be described below, occurs in fitting the adaptor to the main body and in fitting the operating unit to the adaptor.

In other words, the fitting angle of the adapter in the circumferential direction with respect to the main body and the fitting angle of the operating unit in the circumferential direction with respect to the adapter can be arbitrarily selected. However, depending on the combination of two angles, some of the screws for fixing the adaptor to the main body and some of the screws for fixing the operating unit to the adaptor may correspond to the fitting holes located in the same positions in the circumferential direction. In the case of fitting the operating unit to the main body of the transmitter via the adapter at an arbitrary location in the rotation direction, a conflicting/competitive positional relationship may be obtained in using the fitting holes of the adapter or the like. In some cases, the operating unit cannot be fitted to the main body of the transmitter.

The present disclosure has been made to solve the drawbacks of the above-described prior art, and has a purpose of providing a connecting member that allows the connection between an operating portion (the operating unit) and the connecting member (the adapter) or the connection between the connecting member and another connecting member at an arbitrary angle to thereby fit the operating portion and the connecting member to a main body in an arbitrary positional relationship in a rotation direction, and a radio control transmitter using the same.

One example of the present invention is a connecting member in a radio control transmitter configured to transmit a control signal to a control target by controlling an operating portion detachably attached to a main body, the connecting member being disposed between the main body and the operating portion to randomly set a position of the operating portion with respect to the main body, wherein the connecting member has outer fitting holes arranged along a circumference of a large diameter and inner fitting holes arranged along a circumference of a small diameter to be concentric with arrangement of the outer fitting holes, and the connecting member and another connecting member adjacent thereto are combined in an arbitrary arrangement in a circumferential direction and fixed by fixing tools penetrating through either the outer fitting holes or the inner fitting holes.

Further, the case of using three or more connecting members is included in the scope of the present disclosure. In other words, when the above-described another connecting member is considered as a new connecting member, the configuration in which new connecting member and another new connecting member are combined in an arbitrary arrangement in a circumferential direction and fixed by fixing tools penetrating through either the outer fitting holes or the inner fitting holes is also included in the scope of the present disclosure.

Another example of the present invention which is based on the above one example of the present invention is characterized in that the connecting member includes a fixing adapter attached to the main body, an angle setting adapter selectively disposed between the fixing adapter and the operating portion to set a tilt angle of the operating portion with respect to the main body, and a distance setting adapter selectively disposed between the fixing adapter and the operating portion to set a distance of the operating portion with respect to the main body.

Further, the fixing adaptor may not be integrated with the main body of the transmitter, or may be fixed thereto without being integrated with the transmitter. Alternatively, a fitting hole may be directly formed in the main body of the transmitter.

Still another example of the present invention relates to a radio control transmitter for transmitting a control signal to a control target by operating an operating portion detachably attached to a main body, wherein a connecting member disposed between the main body and the operating portion to arbitrarily set a position of the operating portion with respect to the main body has outer fitting holes arranged along a circumference of a large diameter and inner fitting holes arranged along a circumference of a small diameter to be concentric with the arrangement of the outer fitting holes, and the operating portion and the connecting member are integrally connected to the main body by fixing the connecting member and another connecting member adjacent thereto using fixing tools penetrating through either the outer fitting holes or the inner fitting holes in a state where the connecting members are combined in an arbitrary arrangement in the circumferential direction.

BRIEF DESCRIPTION OF THE DRAWINGS

The objects and features of the present disclosure will become apparent from the following description of embodiments, given in conjunction with the accompanying drawings, in which:

FIGS. 4A to 4C are front views of the distance setting adapter disposed at the radio control transmitter according to the embodiment, wherein FIG. 4A shows an adapter having a long setting distance, FIG. 4B shows an adapter having an intermediate setting distance, and FIG. 4C shows an adapter having a short setting distance;

FIGS. 6A and 6B are front views of the angle setting adapter disposed at the radio control transmitter according to the embodiment, wherein FIG. 6A shows an adapter having a relatively small setting angle, and FIG. 6B shows an adapter having a relatively large setting angle;

DETAILED DESCRIPTION

A radio control transmitter (hereinafter, simply referred to as "transmitter 1") according to a first embodiment of the present disclosure will be described with reference to FIGS. 1 to 7.

Figure 1:
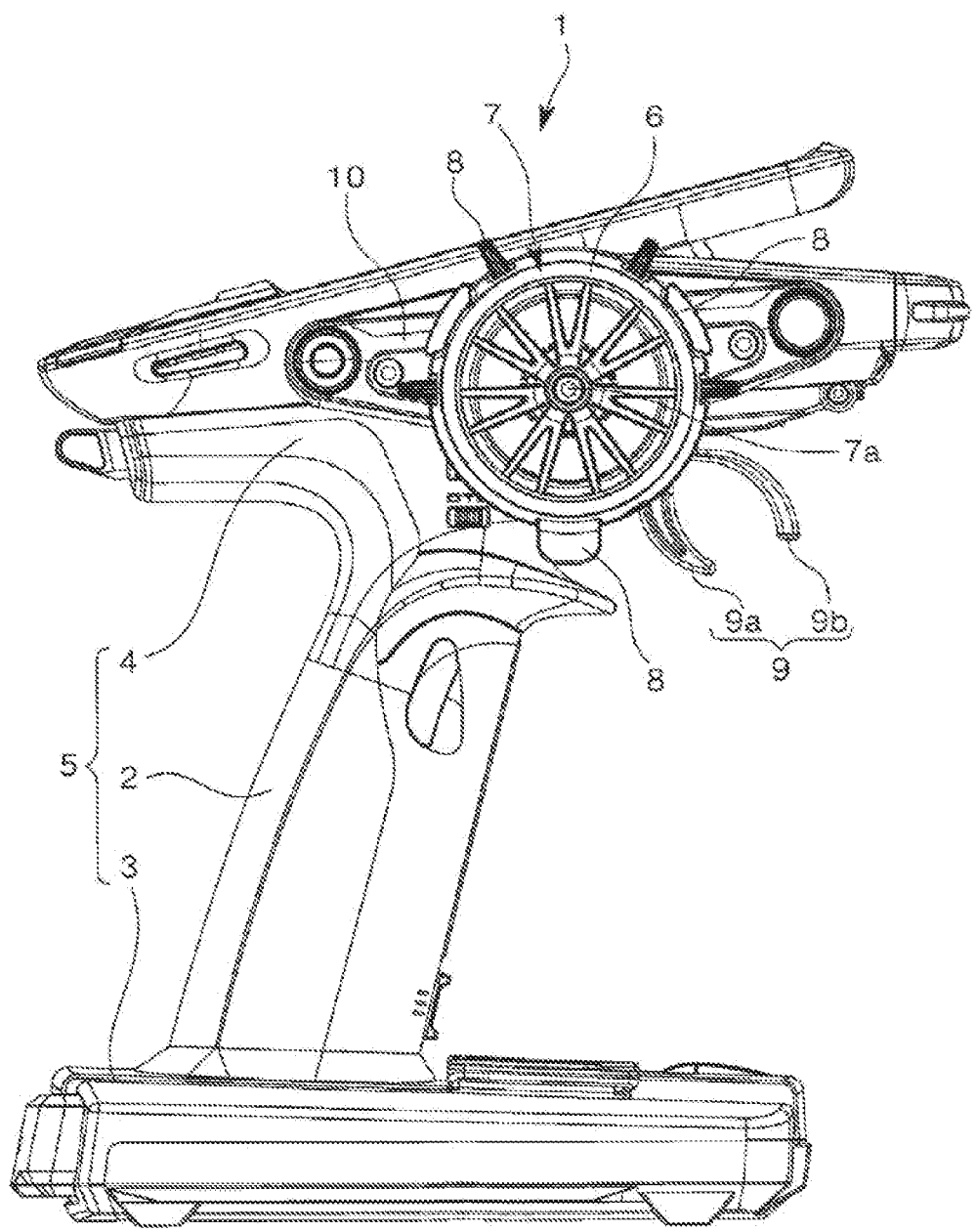
FIG. 1 is a front view of a radio control transmitter according to an embodiment.

The transmitter 1 according to the embodiment shown in FIG. 1 is characterized in that an operator can randomly control the arrangement of a wheel unit 7 that is a rotary operating portion with respect to a main body of the transmitter 1 by fitting the wheel unit 7 to the main body of the transmitter 1 via various connecting members (adapter). Particularly, the transmitter 1 is characterized in that the connection between the wheel unit 7 and the adaptor or the connection between the adapters can be made at an arbitrary angle in the rotation direction.

The radio control transmitter according to the first embodiment performs remote control of a control target, e.g., various models (automobiles, motorcycles, aircraft, ships, and the like), a drone, an industrial machine such as a crane or the like, by using a predetermined frequency band and transmitting to the control target a control signal (radio wave) corresponding to an operation of the rotary operating portion such as a wheel 6, a trigger 9, or the like. In the present embodiment, it is assumed that the control target is a model car and an engine is used as the power source of the control target. However, the control target is not limited to a model car, and the power source is not limited to an engine and may be a motor.

First, a basic structure of the transmitter 1 will be described.

As shown in FIG. 1, the transmitter 1 includes a housing 5 that is a main body including individual components of a grip portion 2, a base portion 3, and a head portion 4. The individual components of the housing 5 are made of a thermoplastic resin (e.g., general-purpose plastic).

The grip portion 2 has a lower end integrated with the base portion 3 and an upper end integrated with the head portion 4. The grip portion 2 functions as a grip portion gripped by an operator who performs remote control of the control target.

The base portion 3 is a substantially rectangular portion disposed at the lower end of the grip portion 2. The base portion 3 prevents a hand gripping the grip portion 2 from slipping out of the grip portion 2 by restricting a lower limit position of the hand, and also functions as a leg when the transmitter 1 is not used and placed upright on the ground, for example. Although not shown, a battery is built in the base portion 3.

The head portion 4 is disposed at the upper end of the grip portion 2, and includes a wheel unit that is a rotary operating portion, and a trigger 5 that is a rotary operating portion.

The wheel unit 7 includes a disc-shaped wheel 6 functioning as a steering for controlling a traveling direction of a control target, and a plurality of switches 8 disposed at different locations on a circumference. An operator can control the switches 8 while rotating the wheel 6. As shown in FIG. 1, the wheel unit 7 is attached to the head portion 4 such that the wheel 6 is rotatable about a rotation shaft 7a extending in a direction perpendicular to a paper surface. The traveling direction of the control target, e.g., a model car, can be controlled by rotating the wheel 6 in a clockwise direction and a counterclockwise direction from a predetermined reference position.

The trigger 9 is an operating member for controlling a moving speed of the control target by controlling a power source of the control target, e.g., the engine of a model car. The trigger 9 has a trigger shape shown in FIG. 1 and rotates about a rotation shaft (not shown). The trigger 9 has two levers, i.e., a throttle lever 9a for accelerating the control target and a brake lever 9b for decelerating the control target.

In general, in controlling the radio control transmitter 1, an operator is located on the left side of the transmitter 1 in FIG. 1 toward the right side, grips the grip portion 2 with a hand opposite to a dominant hand, controls the trigger 9 with some of the fingers of the hand gripping the grip portion 2, and rotates the wheel 6 with the fingers of the dominant hand.

The transmitter 1 shown in FIG. 1 is for a right-handed person, and the wheel unit 7 is located on the front side in FIG. 1, i.e., on the right side when viewed from an operator. In general, a right-handed operator grips the grip portion 2 with a left hand, controls the trigger 9 with an index finger of the left hand, and controls the wheel 6 with a right hand. Since, however, the fixing adapter 10 and the wheel unit 7 can be attached to and detached from the housing 5, the transmitter 1 can be used for a left-handed person by providing the fixing adaptor 10 and the wheel unit 7 on a rear surface of the head portion 4 (left side when viewed from an operator) in FIG. 1. The above-described manner of holding the transmitter 1 by the operator is merely an example, and the transmitter 1 may be gripped by the opposite hand. For example, a right-handed operator may grip the grip portion 2 with a right hand, or a left-handed operator may grip the grip portion 2 with a left hand.

Next, a fixing structure for fitting the wheel unit 7 to the head portion 4 in the transmitter 1 will be described.

As shown in FIG. 1, the wheel unit 7 can be attached to and detached from the front surface of the head portion 4 (right surface when viewed from the operator) via the fixing adapter 10 that is a connecting member.

Figure 2:
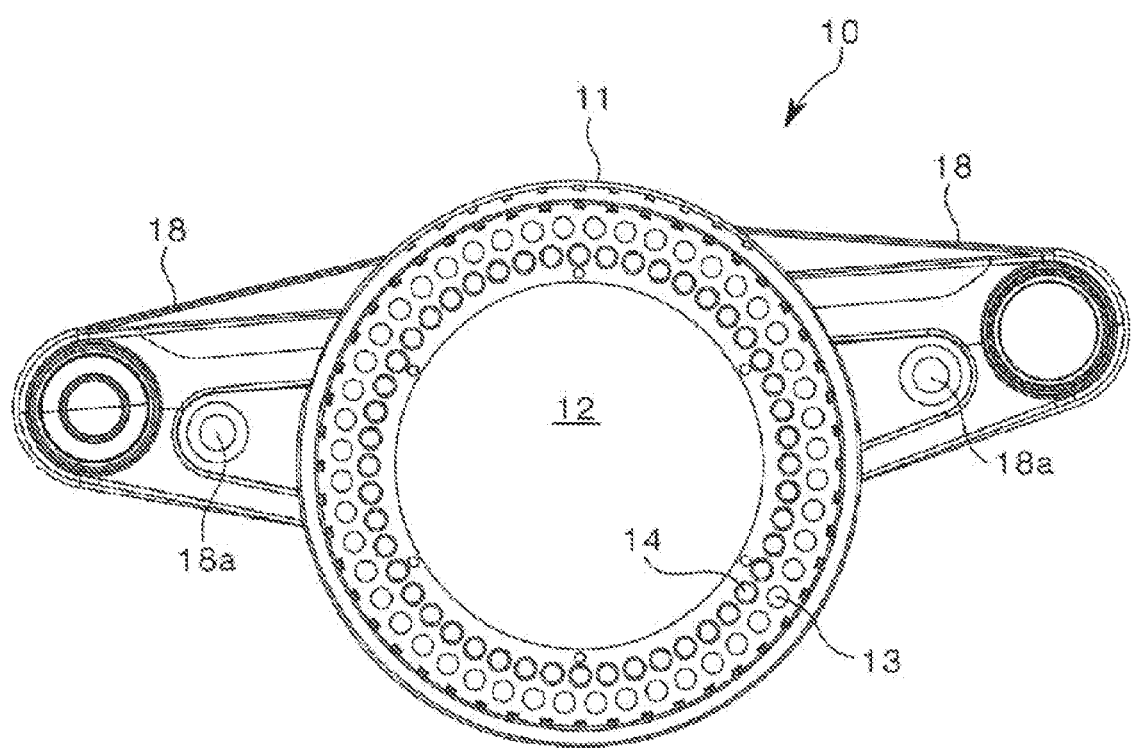
FIG. 2 is a front view of a fixing adapter disposed at the radio control transmitter according to the embodiment.

FIG. 2 shows the front surface of the fixing adapter 10 for attaching the wheel unit 7 to the head portion 4. The fixing adapter 10 includes an annular first fitting portion 11 having a through hole 12 at the center thereof. As shown in the perspective view of FIG. 3, the first fitting portion 11 is a ring-shaped plate whose thickness is small compared to its diameter, and has a plurality of outer fitting holes 13 arranged along a circumference of a large diameter and the same number of inner fitting holes 14 arranged along a circumference of a small diameter to be concentric with the arrangement of the outer fitting holes 13. A circumferential stepped portion having different heights in a radial direction is formed between the outer fitting holes 13 and the inner fitting holes 14, and the same outer fitting holes 13 and inner fitting holes 14 are fitted to other adaptors 20 and 30 having the same stepped portion due to the matched shape. Female screws are formed at the fitting holes 13 and 14, so that the above-described wheel unit 7 or the distance setting adaptor 20 to be described later can be fitted by fixing screws 15 and 16. In order to obtain a stable fixing state, four fixing screws 15 and 16 (see FIG. 3 and FIG. 7 to be described later) used for fixing the adapters and fixing the wheel unit 7 and the adapter may be provided for one fixing position. This is the same for fixing screws 17 shown in FIGS. 5 and 7 that will be described later.

A fixing tool in the present disclosure corresponds to the fixing screws 15 to 17 of the present embodiment. However, the fixing screw is only an example of the fixing tool, and the fixing tool may not be a screw, and may be a fixing device using another fastening principle as long as it fixes one connecting member and another connecting member adjacent thereto while penetrating through a fitting hole.

In the embodiment, the connecting member (adapter) includes, other than the fixing adapter 10, the distance setting adapter 20 and the angle setting adapter 30 as will be described later. Although it will be described in detail later, the adapters 20 and 30 also have outer fitting holes and inner fitting holes 14 having the same size, arrangement, and the like as those of the fixing adapter 10. In the embodiment, forty-eight outer fitting holes 13 and forty-eight inner fitting holes 14 exist in principle. Therefore, in the case of fitting the wheel unit 7, the fitting position in the rotation direction can be adjusted and set in a unit angle of 7.5° (360°/48) in the rotation direction. For convenience of design, the fitting holes may not be formed locally. The number of holes and the unit angle for adjusting the position in the rotation direction can be arbitrarily set depending on embodiments.

In the case of assembling individual components of the fixing adapter 10, the distance setting adapter 20 and the angle setting adapter 30 that will be described later, and the wheel unit 7 to adjust the arrangement in the circumferential direction, the corresponding positional relationship can be fixed by forming recesses and protrusions in the unit angle around a connecting surfaces of each member, performing temporary positioning at a predetermined position in the circumferential direction by engaging the recesses and the protrusions at the time of connecting the members, and screwing the plurality of fixing screws (four in the embodiment) 15 to 17 (see FIGS. 3, 5 and 7) into the outer fitting holes 13 or the inner fitting holes 14 in that state.

As shown in FIG. 2, two fixing arms 18 extending in a direction orthogonal to a thickness direction (perpendicular to a paper surface) of the first fitting portion 11 are disposed at two locations on the outer peripheral surface of the first fitting portion 11. Each of the fixing arms 18 has a fixing hole 18a. By inserting fixing screws into the fixing holes 18a and screwing them into the screw holes formed in the head portion 4 of the transmitter 1, the fixing adapter 10 can be fixed to the head portion 4 as shown in FIG. 1.

Figure 3:
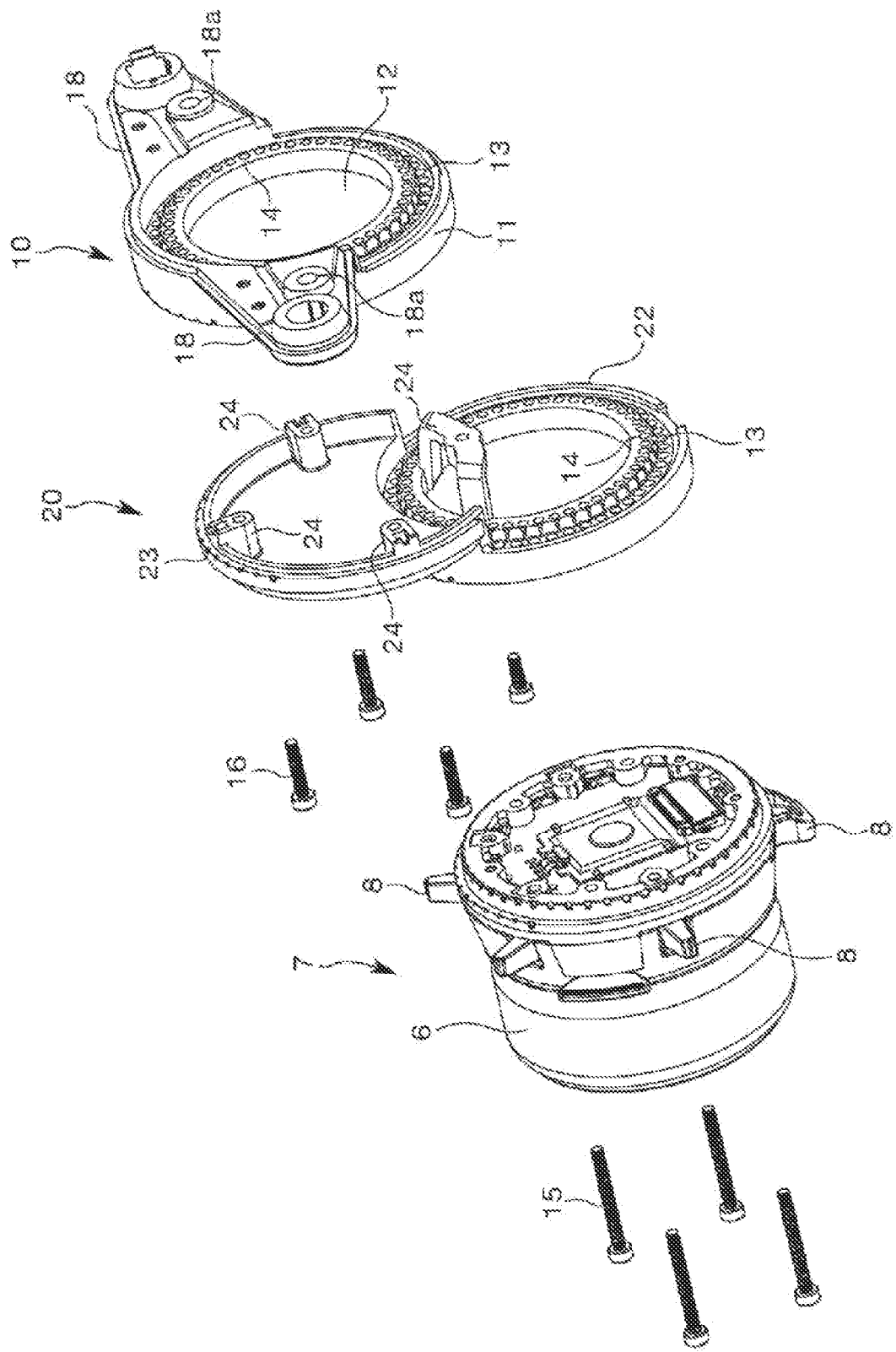
FIG. 3 is an exploded perspective view showing a state in which a fixing adapter, a distance setting adapter, and an operating portion attached to the radio control transmitter according to the embodiment are separated from a main body.
Figure 4:
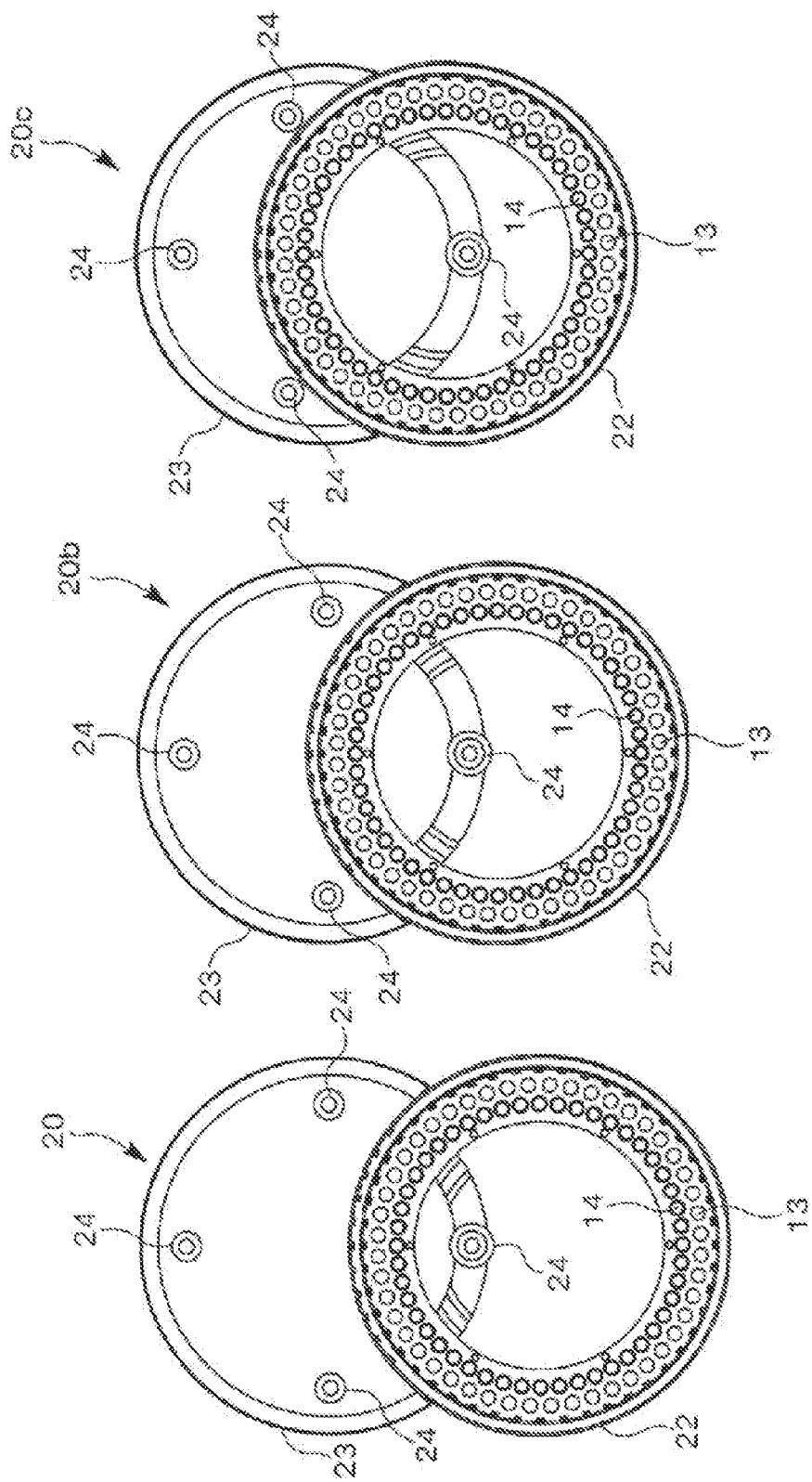

FIG. 3 is an exploded perspective view for explaining an assembly structure of the fixing adapter 10, the distance setting adapter 20 to be described later, and the wheel unit 7. Although it will be referred to in later description of the distance setting adapter 20, the wheel unit 7 can be directly attached to the fixing adapter 10 on the assumption that the distance setting adapter 20 to be described later is omitted in a state shown in FIG. 3. In other words, in a state where the distance setting adapter 20 to be described later is omitted from the state of FIG. 3, the wheel unit 7 can be attached to the housing of the transmitter 1 as shown in FIG. 1 by attaching the fixing adapter 10 to the head portion 4 of the transmitter 1 using a fixing screw(s) (not shown) and inserting the fixing screws 15 into insertion holes (not shown) of the wheel unit 7 from an outer surface side of the wheel unit 7 to be screwed into the inner fitting holes 14 of the fixing adapter 10.

In this case, the wheel unit 7 is directly attached to the fixing unit and another adapter is not required, so that the above-described conflict problem does not occur regardless of the selection of the position in the rotation direction of the wheel unit 7.

The distance setting adapter 20 shown in FIG. 3 is an intermediate member disposed between the fixing adapter 10 of the transmitter 1 and the wheel unit 7 to set a distance or a linear arrangement relationship of the wheel unit 7 with respect to the housing 5 a desired state. The distance setting adapter 20 has a second fitting portion 22 having a structure similar to that of the first fitting portion 11 of the fixing adapter 10. The second fitting portion 22 is a ring-shaped plate whose thickness is small with respect to its diameter, and has a plurality of outer fitting holes 13 arranged along a circumference of a large diameter, and the same number of inner fitting holes 14 arranged along a circumference of a small diameter to be concentric with the arrangement of the outer fitting holes 13. The above-described wheel unit 7 or the angle setting adapter 30 to be described later can be fitted by screwing the fixing screw 15 into these fitting holes. Further, the distance setting adapter 20 has a third fitting portion 23. The third fitting portion 23 is a disc-shaped body having substantially the same outer diameter as that of the second fitting portion 22, and is parallel to the second fitting portion 22 substantially on the same plane while partially overlapping with the second fitting portion 22 in a state where the axes thereof are made to be eccentric. Although the third fitting portion 23 is integrated with the second fitting portion 22, the portion thereof overlapping with the second fitting portion 22 is cut out. Four fitting supports 24 are disposed at intervals of 90° in the circumferential direction of the third fitting portion 23, and each of the fitting supports 24 has insertion holes for the fixing screws 16. The fixing screws 16 can be inserted into the fitting supports 24 and screwed into the inner fitting holes 14 of the fixing adapter 10 or the inner fitting holes 14 of the angle setting adapter 30 to be described later.

In FIG. 3, the fixing adapter 10 is attached to the head portion 4 of the transmitter 1 using the fixing screws. The fixing screws 15 are inserted into insertion holes (not shown) of the wheel unit 7 from the outer surface side of the wheel unit 7 and screwed into the inner fitting holes 14 of the second fitting portion 22 of the distance setting adapter 20. Further, the fixing screws 16 are inserted into the fitting supports 24 of the third fitting portion 23 of the distance setting adapter 20 and screwed into the inner fitting holes 14 of the first fitting portion 11 of the fixing adapter 10. Accordingly, the wheel unit 7 can be moved from the fitting position shown in FIG. 1 to a position moved by a distance between the centers of the second fitting portion 22 and the third fitting portion 23 in the distance setting adapter 20. The moving angle in the circumferential direction can be set arbitrarily.

In the case shown in FIG. 3, the wheel unit 7 is fitted to the second fitting portion 22 of the distance setting adapter 20, and the third fitting portion 23 of the distance setting adapter 20 is fitted to the fixing adapter 10, so that another adapter is not required. Therefore, the above-described conflict problem does not occur regardless of the selection of the position in the rotation direction of the wheel unit 7 or the position in the rotation direction of the distance setting adapter 20 with respect to the fixing adapter 10.

FIGS. 4A to 4C are front views showing various shapes of the distance setting adapter 20. FIG. 4A shows the distance setting adapter 20 having a long setting distance. FIG. 4B shows a distance setting adapter 20b having an intermediate setting distance. FIG. 4C shows a distance setting adapter 20c having a short setting distance.

Figure 5:
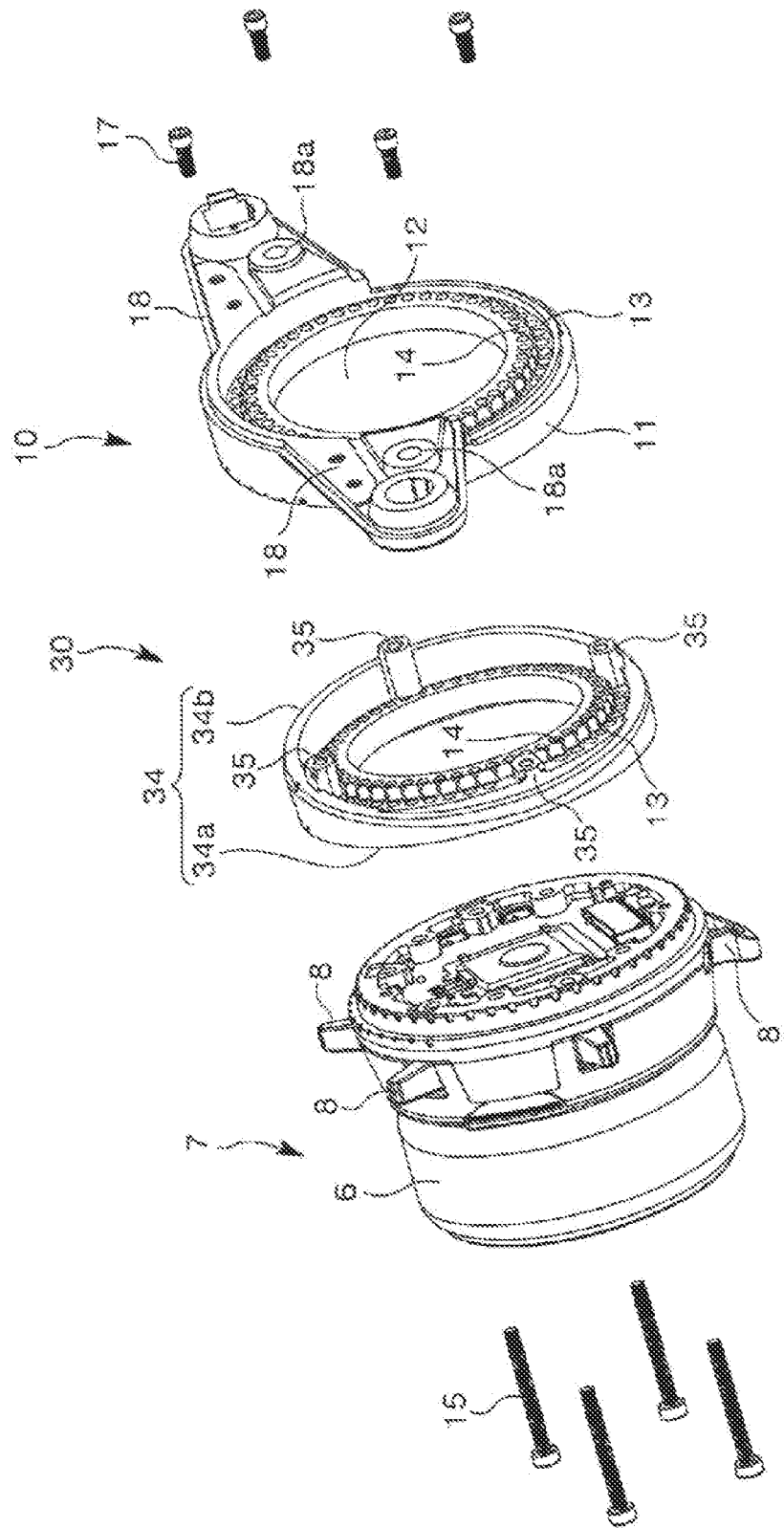
FIG. 5 is an exploded perspective view showing a state in which a fixing adapter, an angle setting adapter, and an operating portion attached to the radio control transmitter according to the embodiment are separated from the main body.
Figure 6:
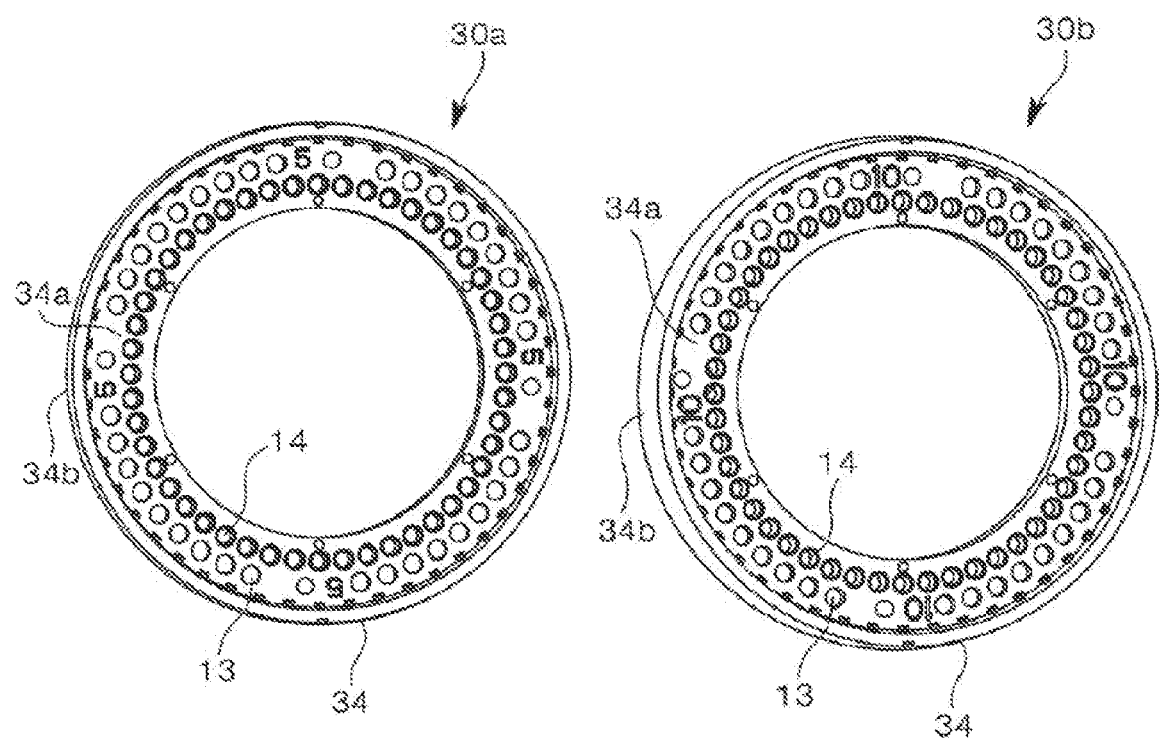

FIG. 5 is an exploded perspective view showing a state in which the fixing adapter 10, the angle setting adapter 30, and the wheel unit 7 are separated from the housing 5 of the transmitter 1. The angle setting adapter 30 is an intermediate member disposed between the fixing adapter 10 and the wheel unit 7 to tilt an angle of the rotation shaft of the wheel unit 7 with respect to the housing 5 by a predetermined angle from a state perpendicular to the paper surface shown in FIG. 1. The angle setting adapter 30 has a fourth fitting portion 34 having a structure similar to that of the first fitting portion 11 of the fixing adapter 10 or the second fitting portion 22 of the distance setting adapter 20. The fourth fitting portion 34 is a ring-shaped plate whose thickness is small with respect to its diameter, and has a plurality of outer fitting holes 13 arranged along a circumference of a large diameter, and the same number of inner fitting holes 14 arranged along a circumference of a small diameter to be concentric with the arrangement of the outer fitting holes 13. The fourth fitting portion 34 has a wheel fitting portion 34a on the front surface side to which the wheel unit 7 is fitted, and a tilted fitting portion 34b disposed on the opposite side and having a shape obtained by cutting a cylinder at a predetermined tilt angle. Four fitting supports 35 are disposed at intervals of 90° in the circumferential direction at the inner side of the tilted fitting portion 34b, and the fitting supports 35 have insertion holes for the fixing screws 15.

As shown in FIG. 5, the angle setting adapter 30 can be attached to the wheel unit 7 by inserting the fixing screws 15 from the front side of the wheel unit 7 and screwing them into the inner fitting holes 14 of the angle setting adapter 30. Further, the fixing adapter 10 can be attached to the angle setting adapter 30 to which the unit 7 is fixed by positioning the tilted fitting portion 34b of the angle setting adapter 30 with respect to the fixing adapter 10, and inserting the fixing screws 17 from the outer fitting holes 13 of the fixing adapter 10 to be screwed into the outer fitting holes 13 of the angle setting adapter 30. Further, by fixing the fixing adapter 10 to the housing 5 of the transmitter 1, the wheel unit 7 can be attached to the housing 5 of the transmitter 1 in a state where the axis is tilted.

FIGS. 6A and 6B are front views showing various tilt angles of the angle setting adapter 30. FIG. 6A shows an angle setting adapter 30a having a setting angle of 5°, and FIG. 6B shows an angle setting adapter 30b having a setting angle of 10°. By providing the angle setting adapter 30 between the fixing adapter 10 and the wheel unit 7 as shown in FIG. 5, the central axis of the wheel 6 perpendicular to the paper surface shown in FIG. 1 can be tilted at an angel of 5° or 10° from the vertical direction at a position of an arbitrary rotation angle in the circumferential direction.

In the case shown in FIG. 5, the wheel unit 7 and the fixing adapter 10 are integrated via the angle setting adapter 30, so that conflict may occur in required fitting holes between the position in the rotation direction of the wheel unit 7 and the position in the rotation direction of the angle setting adapter 30 with respect to the fixing adapter 10 when the individual components have the connecting structure described in "Background" and the fitting holes of the adapter are simply arranged in one row in the circumferential direction. However, in accordance with this embodiment, at least the fitting holes of the angle setting adapter 30 are arranged in double rows of different diameters. Thus, the conflict problem can be avoided by separately using the inner holes and the outer holes appropriately.

Figure 7:
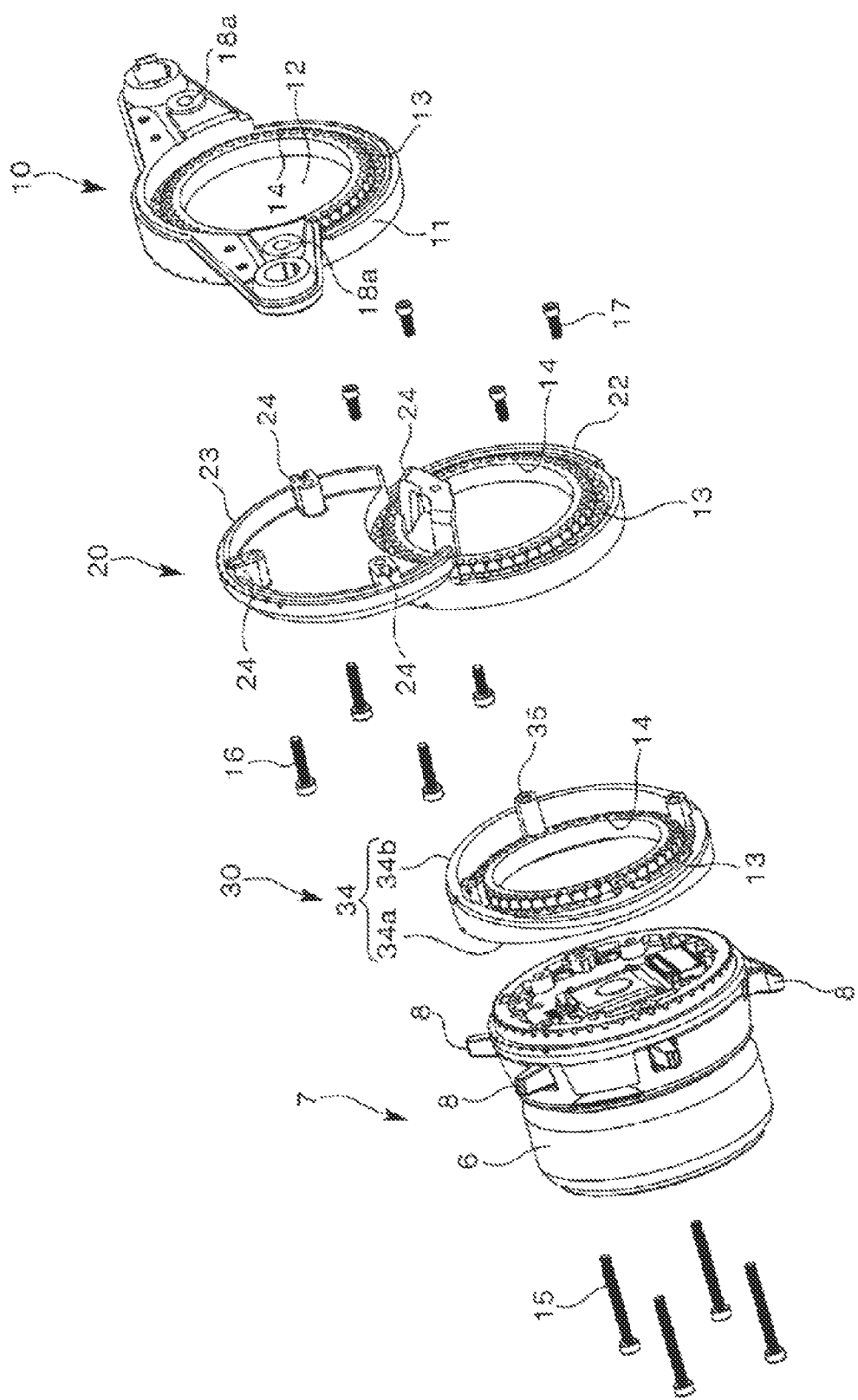
FIG. 7 is an exploded perspective view showing a state in which a fixing adapter, a distance setting adapter, an angle setting adapter, and an operating portion attached to the radio control transmitter according to the embodiment are separated from the main body.

FIG. 7 is an exploded perspective view showing a state in which the fixing adapter 10, the distance setting adapter 20, the angle setting adapter 30, and the wheel unit 7 that are attached to the transmitter 1 according to the embodiment are separated from the housing 5 of the transmitter 1.

As shown in FIG. 7, the angle setting adapter 30 can be attached to the wheel unit 7 by inserting the fixing screws 15 from the front side of the wheel unit 7 and screwing them into the inner fitting holes 14 of the angle setting adapter 30.

Further, the wheel unit 7, the angle setting adapter 30, and the distance setting adapter 20 can be integrated by positioning the tilted fitting portion 34b of the angle setting adapter 30 with respect to the second fitting portion 22 of the distance setting adapter 20, inserting the fixing screws 17 into the outer fitting holes 13 of the second fitting portion 22, and screwing them into the outer fitting holes 13 of the angle setting adapter 30. Then, the third fitting portion 23 of the distance setting adapter 20 is fixed to the fixing adapter 10 using the fixing screws 16. Next, the fixing adapter 10 is fixed to the housing 5 of the transmitter 1. Accordingly, the position of the wheel unit 7 is changed such that the axis is moved in parallel by a predetermined distance and tilted at a predetermined tilt angle from a state in which the axis is perpendicular to the paper surface at the position shown in FIG. 1.

In the case shown in FIG. 7, the wheel unit 7 and the distance setting adapter 20 are integrated via the angle setting adapter 30, so that conflict may occur in required fitting holes between the position in the rotation direction of the wheel unit 7 and the position in the rotation direction of the angle setting adapter 30 with respect to the distance setting adapter 10 when the individual components have the connecting structure described in "Background" and the fitting holes of the adapter are simply arranged in one row in the circumferential direction. However, in accordance with this embodiment, at least the fitting holes of the angle setting adapter 30 are arranged in double rows of different diameters. Thus, the conflict problem can be avoided by separately using the inner holes and the outer holes appropriately.

In FIG. 7, the positions of the distance setting adapter 20 and the angle setting adapter 30 can be changed. In this case as well, the conflict of the fitting holes in the angle setting adapter 30 disposed between the distance setting adapter 20 and the fixing adapter 10 can be avoided by separately using the outer fitting holes 13 and the inner fitting holes 14 appropriately.

Further, in FIG. 7, another angle setting adapter 30 may be disposed between the fixing adapter 10 and the third fitting portion 23 of the distance setting adapter 20. In this case, the conflict can be avoided by fixing the fixing screws 16 that have penetrated through the fitting supports 24 of the third fitting portion 23 to the inner fitting holes 14 of the angle setting adapter 30, and fixing the fixing screws that have penetrated through the outer fitting holes 13 of the fixing adapter 10 to the outer fitting holes 13 of the angle setting adapter 30.

The type, number, and order of the connecting members (the distance setting adapter 20 or the angle setting adapter 30) disposed between the fixing adapter 10 and the wheel unit 7 can be appropriately selected such that the wheel unit 7 can be located at a position where it is easy for an operator to control, i.e., such that desired arrangement of the wheel unit 7 with respect to the housing 5 can be realized.

Next, the connecting member (adapter) of a second embodiment will be described with reference to FIGS. 8 and 9.

Figure 8:
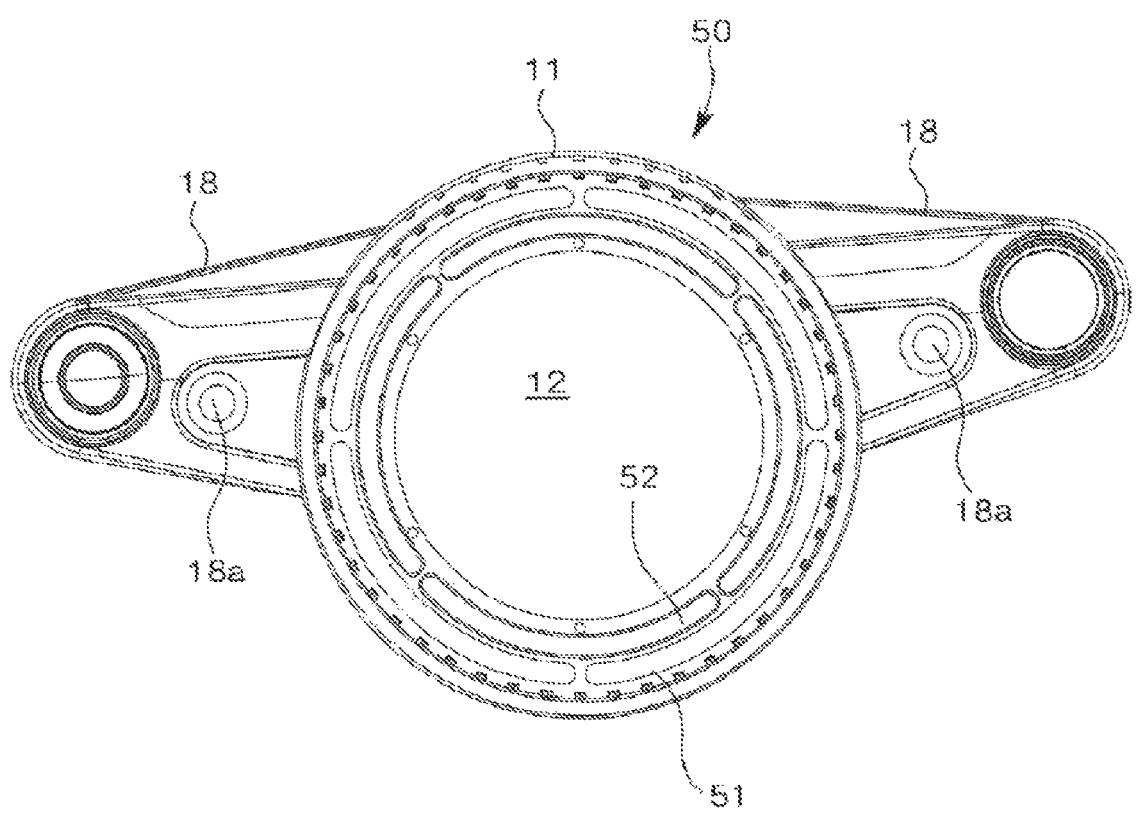
FIG. 8 is a front view of a fixing adapter according to another embodiment.

FIG. 8 is a front view of the fixing adapter 50 according to the second embodiment. The first fitting portion 11 has outer fitting holes 51 that are four elongated holes or curved grooves arranged along a circumference of a large diameter, and inner fitting holes 52 that are four elongated holes or curved grooves arranged along a circumference of a small diameter to be concentric with the arrangement of the outer fitting holes 51.

Figure 9:
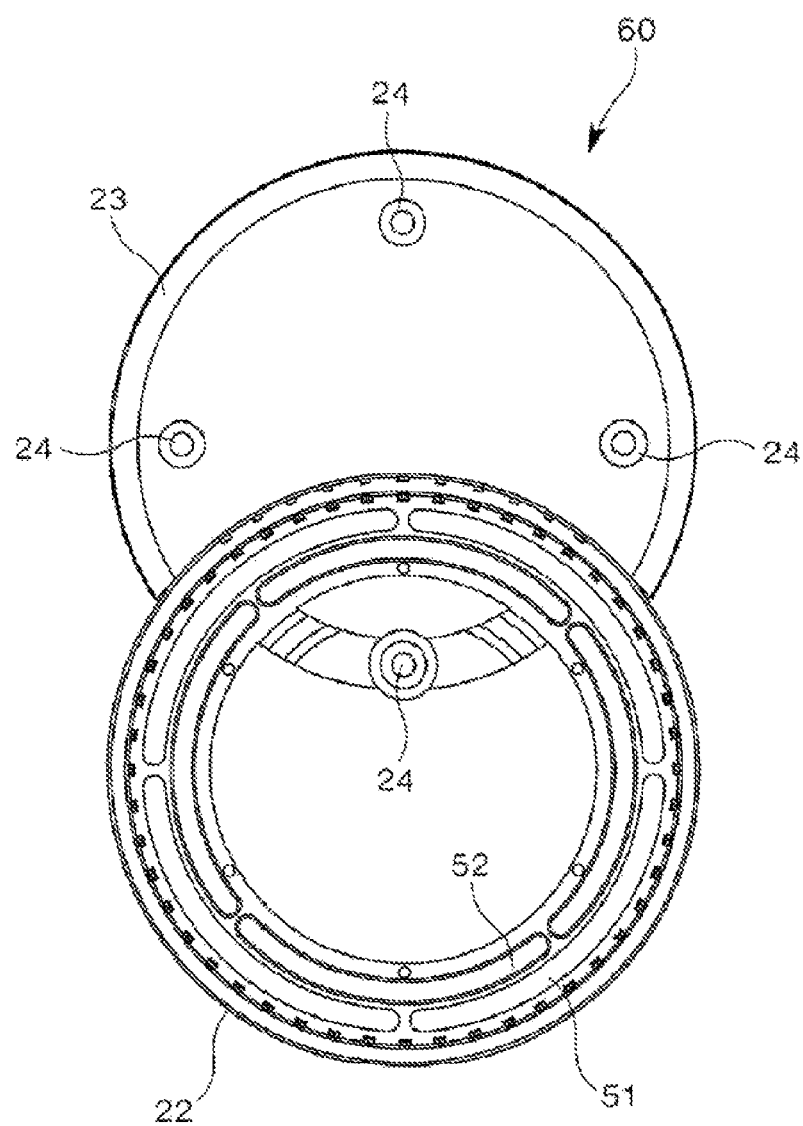
FIG. 9 is a front view of a distance setting adapter according to another embodiment.

FIG. 9 is a front view of the distance setting adapter 60 according to the second embodiment. The second fitting portion 22 has outer fitting holes 51 that are four elongated holes or curved grooves arranged along a circumference of a large diameter, and inner fitting holes 52 that are four elongated holes or curved grooves arranged along a circumference of a small diameter to be concentric with the arrangement of the outer fitting holes 51.

In the fixing adapter 50 shown in FIG. 8 and the distance setting adapter 60 shown in FIG. 9, discontinuous portions of the outer fitting holes 51 and discontinuous portions of the inner fitting holes 52 are arranged so as not to be in the same location in the circumferential direction.

Other configurations are the same as those of the first embodiment, so that like reference numerals in the first embodiment are used to denote like parts in FIGS. 8 and 9 and the description of the first embodiment is cited. Although it is not illustrated, the angle setting adapter can also be used in the second embodiment. In that case, the outer fitting holes and the inner fitting holes have an elongated hole structure similarly to that in the fixing adapter 50 and the distance setting adapter 60.

The connecting member (adapter) having an elongated hole (or elongated groove) of the second embodiment can provide the same effect obtained in the first embodiment.

As described above, in accordance with the embodiment of the present disclosure, when the wheel unit 7 is attached to the housing 5 of the transmitter 1, the arrangement of the wheel unit 7 with respect to the main body can be arbitrarily adjusted and set in terms of the distance (length) or the angle (tilt angle) with respect to the housing by fixing the housing 5 and the wheel unit 7 via the connecting member (adapter). In assembling the individual components, the outer fitting holes 13 are used to connect the wheel unit 7 and one adapter adjacent thereto and the inner fitting holes 14 are used to connect one adapter and another adapter adjacent thereto, so that the arrangement in the rotation direction of the wheel unit 7 with respect to one adapter and the arrangement in the rotation direction of another adapter with respect to one adapter do not conflict with each other. In other words, even when the wheel unit 7 and another adapter are adjacent to both sides of one adapter, the fixing screws penetrating through the wheel unit 7 and the fixing screws penetrating through another adapter are not be inserted into the same fitting holes of one adapter. Therefore, the wheel unit 7 and the adaptor can be attached to the housing 5 even if an arbitrary positional relationship is selected in the rotation direction.

The invention claimed is:

1. A connecting member in a radio control transmitter configured to transmit a control signal to a control target by controlling an operating portion detachably attached to a main body, the connecting member being disposed between the main body and the operating portion to randomly set a position of the operating portion with respect to the main body, wherein the connecting member has outer fitting holes arranged along a circumference of a large diameter and inner fitting holes arranged along a circumference of a small diameter to be concentric with arrangement of the outer fitting holes, and the connecting member and another connecting member adjacent thereto are combined in an arbitrary arrangement in a circumferential direction and fixed by fixing tools penetrating through either the outer fitting holes or the inner fitting holes.

2. The connecting member of claim 1, wherein the connecting member includes a fixing adapter attached to the main body, an angle setting adapter selectively disposed between the fixing adapter and the operating portion to set a tilt angle of the operating portion with respect to the main body, and a distance setting adapter selectively disposed between the fixing adapter and the operating portion to set a distance of the operating portion with respect to the main body.

3. A radio control transmitter for transmitting a control signal to a control target by operating an operating portion detachably attached to a main body, wherein a connecting member disposed between the main body and the operating portion to arbitrarily set a position of the operating portion with respect to the main body has outer fitting holes arranged along a circumference of a large diameter and inner fitting holes arranged along a circumference of a small diameter to be concentric with the arrangement of the outer fitting holes, and the operating portion and the connecting member are integrally connected to the main body by fixing the connecting member and another connecting member adjacent thereto using fixing tools penetrating through either the outer fitting holes or the inner fitting holes in a state where the connecting members are combined in an arbitrary arrangement in the circumferential direction.

\* \* \* \* \*